(12) United States Patent
Liu

(10) Patent No.: US 11,956,742 B2
(45) Date of Patent: Apr. 9, 2024

(54) INFORMATION TRANSMISSION METHOD AND APPARATUS, AND COMPUTER READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 161 days.

(21) Appl. No.: 17/606,844

(22) PCT Filed: Apr. 29, 2019

(86) PCT No.: PCT/CN2019/085034
§ 371 (c)(1),
(2) Date: Oct. 27, 2021

(87) PCT Pub. No.: WO2020/220211
PCT Pub. Date: Nov. 5, 2020

(65) Prior Publication Data
US 2022/0217665 A1  Jul. 7, 2022

(51) Int. Cl.
*H04W 56/00* (2009.01)
*H04B 7/022* (2017.01)
*H04W 74/0808* (2024.01)

(52) U.S. Cl.
CPC ........ *H04W 56/0015* (2013.01); *H04B 7/022* (2013.01); *H04W 74/0808* (2013.01)

(58) Field of Classification Search
CPC .......... H04W 56/0015; H04W 74/0808; H04B 7/022
See application file for complete search history.

(56) References Cited

U.S. PATENT DOCUMENTS

2018/0279152 A1  9/2018  Kim et al.

FOREIGN PATENT DOCUMENTS

| CN | 109121152 A | 1/2019 | |
| CN | 109560904 A | 4/2019 | |
| EP | 3471297 A1 | 4/2019 | |
| WO | WO-2018230205 A1 * | 12/2018 | ........... H04B 7/0695 |
| WO | WO-2020177040 A1 * | 9/2020 | ............... H04B 7/04 |

OTHER PUBLICATIONS

European Patent Application No. 19927376.4 extended Search and Opinion dated Apr. 8, 2022; 10 pages.
PCT/CN2019/085034 English translation of the International Search Report dated Feb. 1, 2020, 2 pages.

\* cited by examiner

*Primary Examiner* — Saad A. Waqas
(74) *Attorney, Agent, or Firm* — COZEN O'CONNOR

(57) ABSTRACT

A method and an apparatus for transmitting information. The method includes: generating by an access network device indication information, in which the indication information is configured to indicate a quasi co-located (QCL) parameter; and sending by the access network device a synchronization signal block (SSB), in which a physical broadcast channel (PBCH) of the SSB carries the indication information.

14 Claims, 7 Drawing Sheets

INFORMATION TRANSMISSION METHOD AND APPARATUS, AND COMPUTER READABLE STORAGE MEDIUM

CROSS-REFERENCE TO RELATED APPLICATION

The present application is a national stage of International Application No. PCT/CN2019/085034, filed on Apr. 29, 2019, the content of which is hereby incorporated by reference in its entirety.

TECHNICAL FIELD

The disclosure relates to a field of communication technologies, and more particularly to a method and an apparatus for transmitting information, and a non-transitory computer readable storage medium.

BACKGROUND

In a new radio (NR) system, a device is allowed to perform signal transmission with an unlicensed spectrum.

Before performing the signal transmission with the unlicensed spectrum, the device needs to follow a listen-before-talk (LBT) principle, that is, the device needs to perform a clear channel assessment (CCA) to determine whether a channel of the unlicensed spectrum is occupied, and send a signal through the channel of the unlicensed spectrum when determining that the channel is not occupied (i.e., idle).

To follow the LBT principle, the position of sending a synchronization signal block (SSB) by an access network device within each period is not fixed.

SUMMARY

Embodiments of the disclosure provide a method and an apparatus for transmitting information, and a non-transitory computer readable storage medium.

According to a first aspect of the disclosure, a method for transmitting information is provided. The method includes: generating by an access network device indication information, the indication information being configured to indicate a quasi co-located (QCL) parameter; and sending by the access network device a synchronization signal block (SSB), a physical broadcast channel (PBCH) of the SSB carrying the indication information.

According to a second aspect of the disclosure, a method for transmitting information is provided. The method includes: receiving a synchronization signal block (SSB) sent by an access network device within a first period, in which the SSB carries indication information configured to indicate a value of a QCL parameter used by the access network device; acquiring the indication information from the SSB; and determining a signal detection position within a second period based on the indication information and a first SSB candidate position, in which the second period is a next period of the first period, and the first SSB candidate position is an SSB candidate position where the SSB is received within the first period.

According to a third aspect of the disclosure, an apparatus for transmitting information is provided. The apparatus includes: a processor; and a memory configured to store instructions executable by a processor; the processor is configured to execute the method for transmitting information as described in any of the first aspect.

According to a fourth aspect of the disclosure, a computer readable storage medium having computer instructions stored thereon is provided. When the computer instructions are executed by a processor, the processor is caused to implement the method as described in any of the first aspect.

It should be understood that, the above general descriptions and latter detailed descriptions are only illustrated and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Figure 1:
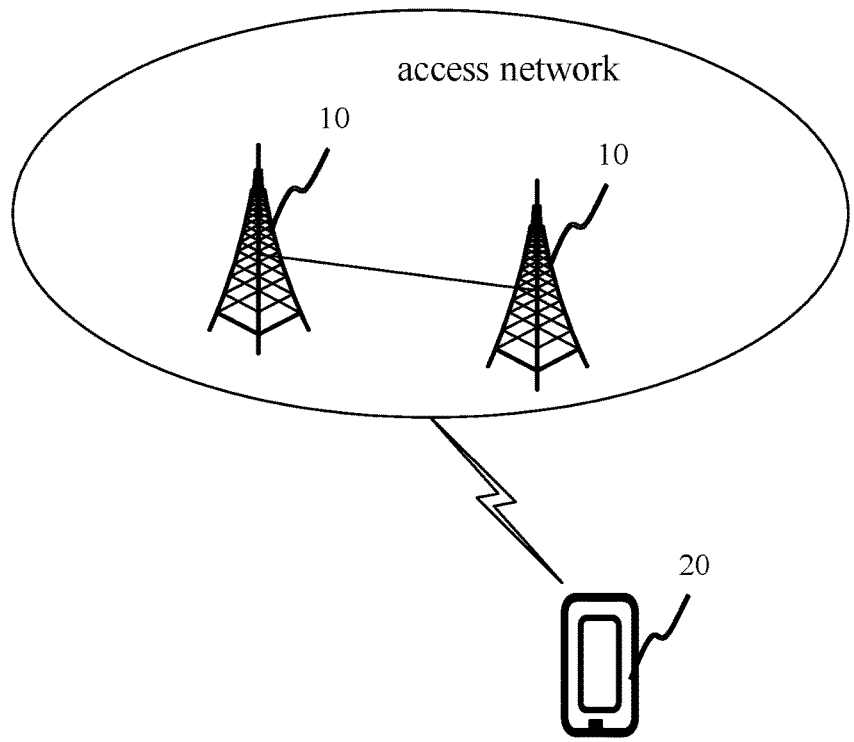
FIG. 1 is a schematic diagram illustrating an architecture of a communication system according to an example embodiment.

Reference will be made in detail to embodiments of the present disclosure. Throughout the description with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

It should also be understood that, as used herein, "several" means one or more than one, and "a plurality of" means two or more than two, unless specified otherwise. The term "and/or" describes association relations of associated objects and represents three kinds of relations of the associated objects. For example, A and/or B may represent merely A, both A and B, merely B. The character "/" generally represents the relation "or" of the associated objects. The terms "first", "second" and similar words used in the specification and claims of the disclosure do not represent any sequence, quantity, or importance, but are merely configured to distinguish different components.

Referring to FIG. 1, FIG. 1 illustrates a schematic diagram of an architecture of a mobile communication system according to an embodiment of the disclosure. The mobile communication system may include an access network device 10 and a terminal 20.

The access network device 10 is deployed in an access network 12 to provide a wireless access function for the terminal 20. The access network device may be a base station (BS). The access network device 10 may wirelessly communicate with the terminal 20 via one or more antennas. The access network device 10 may provide communication coverage for its geographic area. The base station may include a macro base station, a micro base station, a relay station, an access point, etc. In some embodiments, the base station may be called as a base station transceiver, a wireless base station, an access point, a wireless transceiver, a basic service set (BSS), an extended service set (ESS), a NodeB, an evolved NodeB (eNB or eNodeB), or some other appropriate terms. For example, in a 5G system, the base station may be referred to as gNB. For convenience of description, in embodiments of the present disclosure, the above apparatus that provides the wireless communication function for the terminal 20 is collectively referred to as an access network device.

The terminal 20 may be distributed in the whole mobile communication system, and each terminal 20 may be stationary or mobile. The terminal 20 may also be referred to by those skilled in the art as a mobile station, a subscriber station, a mobile unit, a subscriber unit, a wireless unit, a remote unit, a mobile device, a user equipment, a wireless device, a wireless communication device, a remote device, a mobile subscriber station, an access terminal, a mobile terminal, a wireless terminal, a remote terminal, a handheld device, a user agent, a mobile client, a client, or some other appropriate terms. The terminal 20 may be a cellular phone, a personal digital assistant (PDA), a wireless modem, a wireless communication device, a handheld device, a tablet computer, a laptop computer, a cordless telephone, a wireless local loop (WLL) station, etc. The terminal 20 may communicate with the access network device 10 in the mobile communication system.

The access network device 10 may communicate with the terminal 20 through a radio technology, for example, a cellular technology. A communication link between the access network device 10 and the terminal 20 may include: a down link (DL) transmission from the access network device 10 to the terminal 20, and/or an up link (UP) transmission from the terminal 20 to the access network device 10. The DL transmission may also be referred to as a forward link transmission, and the UP transmission may also be referred to as a reverse link transmission. In some examples, the DL transmission may include a transmission of a discovery signal, which may include a reference signal and/or a synchronization signal.

The mobile communication system illustrated in FIG. 1 may be a long term evolution (LTE) system, or may be a next generation evolution system based on the LTE system, such as an LTE-A (LTE-Advanced) system or a 5th generation (5G) system (also referred to as an NR system), or may be a next generation evolution system based on the 5G system, etc. The terms "system" and "network" in the embodiments may be used interchangeably, but may be understood by those skilled in the art.

The communication system and business scenario described in embodiments of the present disclosure are intended to explain the technical solution of embodiments of the present disclosure more clearly, and does not constitute a limitation of the technical solution provided by embodiments of the present disclosure. Those skilled in the art know that, with evolution of the communication system and emergence of new business scenarios, the technical solution provided in the embodiments of the present disclosure are equally applied to similar technical problems.

In a conventional LTE system, data transmission between the access network device 10 and the terminal 20 is performed by a licensed spectrum. With the increase of traffic volume, especially in some urban areas, the licensed spectrum may be difficult to meet the requirement of traffic. By introducing a licensed-assisted access (LAA) technology, the data transmission between the access network device 10 and the terminal 20 may be performed by an unlicensed spectrum, thereby meeting the requirement of larger traffic.

The unlicensed spectrum is a spectrum configured for communication between radio devices that is determined based on country and region, which is generally considered as a shared spectrum, that is, the communication devices in different communication systems may use the spectrum as long as the communication devices meet a regulatory requirement on the spectrum specified in the country or region, without applying for a proprietary licensed spectrum to the government. The unlicensed spectrum may also be referred to by those skilled in the art as an license-free spectrum, a shared spectrum, an unlicensed frequency band, a license-free frequency band, a shared frequency band, a grant-free spectrum, a grant-free frequency band, or some other appropriate terms.

A third generation partnership project (3GPP) is discussing an NR unlicensed technology configured to communicate on the unlicensed spectrum with an NR technology. For the NR unlicensed technology, a synchronization signal block (SSB) needs to be sent. In a non-standalone mode, the SSB may be configured for synchronization and measurement of the terminal 20, and in a standalone mode, the SSB may be further configured for an initial access of the terminal 20.

In a time domain, one SSB occupies 4 symbols (that is, orthogonal frequency division multiplexing (OFDM) symbols), and the 4 symbols include: a primary synchronized signal (PSS) of one symbol, a secondary synchronized signal (SSS) of one symbol, and a physical broadcast channel (PBCH) of two symbols. In the SSB, the symbols are numbered from 0 to 3 in an ascending order. In a frequency domain, one SSB occupies 24 consecutive resource blocks (RBs). Each RB includes 12 subcarriers, and the subcarriers in the 24 RBs are numbered from 0 to 287 in an ascending order, starting from the RB with the lowest number. For the PSS and the SSS, resources are mapped to a 127-th subcarrier; for the PBCH, the resources are mapped to a 288-th subcarrier. The PSS, SSS and PBCH have the same cyclic prefix (CP) length and subcarrier spacing. The subcarrier spacing may be configured as 15 kHz, 30 kHz, 120 kHz and 240 kHz.

The access network device may send a signal through an omni-directional beam, or may send a signal through a plurality of directional beams. That is, the number of beams used by the access network device may be one or more. In a frequency band of a current new ratio unlicensed spectrum (NRU), the access network device may use 8 directional beams at most, and generally use an even number of directional beams, so that the number of beams used by the access network device is generally 1, 2, 4, 8. When the number is 1, the beam used by the access network device is an omni-directional beam and covers a range of 360 degrees, or covers a range of less than 360 degrees determined based on the actual environment. When the number is greater than 1, the beam used by the access network device is a directional beam, all beams cover a range of 360 degrees, and each beam covers a range of 360/n, where, N is the number of beams. For example, when the number of beams is 4, each beam covers 90 degrees.

Since the frequency band used by the NRU is high, the signal is mostly sent with a directional beam. When the access network device sends a signal by a directional beam, in order to cover all cells configured on the access network device, the access network device needs to send the same information by sequentially using a plurality of beams in different directions, and this process may be referred to as beam scanning.

To support beam scanning, the SSB is organized into a series of bursts and sent periodically. For beam scanning, in each SSB period, the access network device sends the SSB by each beam, and the plurality of SSBs sent within each SSB period form one burst, and the plurality of SSBs may be numbered in an ascending order from 0. The number of SSBs in one burst may be the same as the number of beams used by the access network device, and the SSBs in one burst are sent by different beams respectively.

Figure 2:
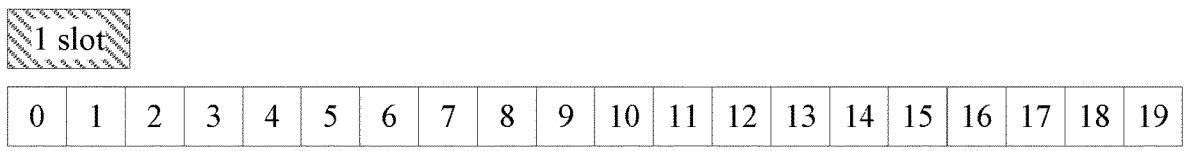
FIG. 2 is a schematic diagram illustrating a distribution of SSB candidate positions according to an example embodiment.

In each SSB period, there are a plurality of SSB candidate positions, which are time domain positions where the access network device may transmit the SSB. The SSB candidate positions may be numbered in an ascending order from 0. FIG. 2 illustrates a schematic diagram of a distribution of SSB candidate positions. As illustrated in FIG. 2, taking a subcarrier spacing of 30 kHz as an example, there are 20 SSB candidate positions within a half frame (5 ms). 1 ins includes 2 slots, and each slot includes 2 SSB candidate positions, so that 20 SSB candidate positions are included in 5 ms, and the 20 SSB candidate positions are numbered in an ascending order from 0, i.e., indexes of the 20 candidate positions are 0-19, respectively.

All SSB candidate positions within one SSB period may correspond to beams used by the base station sequentially. For example, assuming that the number of beams used by the access network device is 2 and the number of the SSB candidate positions is 20, the first SSB candidate position corresponds to the first beam, the second SSB candidate position corresponds to the second beam, the third SSB candidate position corresponds to the first beam, and the fourth SSB candidate position corresponds to the second beam, and so forth. The SSB candidate position corresponding to the beam refers to that the beam may send the SSB at the corresponding SSB candidate position, and other beams in addition to the beam may not send the SSB at the corresponding SSB candidate position.

Since the number of the SSB candidate positions is generally greater than the number of beams used by the access network device, within one SSB period, each beam may send the SSB at one of a plurality of corresponding SSB candidate positions. The plurality of SSB candidate positions corresponding to the same beam constitute an SSB candidate position set of the beam. A certain operation of the index of each SSB candidate position in the SSB candidate position set and a relevant parameter of the beam may result in a same result, so that the terminal may determine a plurality of SSB candidate position sets based on the index of the SSB candidate position and a value of the relevant parameter of the beam. For example, a modulo operation may be performed on the index of the SSB candidate position and a value of a quasi co-located (QCL) parameter.

The modulo operation refers to that a remainder obtained by dividing the index of the SSB candidate position by the value of the QCL parameter is determined as a result of the modulo operation.

In some embodiments of the present disclosure, the value of the QCL parameter may have a one-to-one correspondence with the number of beams that may be used by the access network device, for example, the value of the QCL parameter may be equal to the number of beams, therefore, the indication information may also be configured to indicate the number of beams, that is, the value of the QCL parameter is configured to indicate the number of beams or is associated with the number of beams. Since signals transmitted by the same beam have a QCL relationship, in the embodiments of the disclosure, the SSB candidate positions are based on the value of the QCL parameter.

For example, assume that the number of beams used by the access network device is 4, the value of the corresponding QCL parameter is also 4, 4 beams are beams 1-4 correspondingly, and the beams 1-4 are sequentially adjacent in a clockwise or counterclockwise direction. The number of the SSB candidate positions is 20, and the 20 SSB candidate positions are numbered in an ascending order from 0, so that the indexes of the 20 SSB candidate positions are 0-19, respectively.

In the SSB candidate positions 0-19, the SSB candidate position with the index for which and 4 (the value of the QCL parameter) the modulo operation results in a reminder of 0 is configured as an SSB candidate position in a first SSB candidate position set corresponding to the beam 1, that is, the SSB candidate position 0, the SSB candidate position 4, the SSB candidate position 8, the SSB candidate position 12 and the SSB candidate position 16. In the SSB candidate positions 0-19, the SSB candidate position with the index for which and 4 (the value of the QCL parameter) the modulo operation results in a reminder of 1 is configured as an SSB candidate position in a second SSB candidate position set corresponding to the beam 2, that is, the SSB candidate position 1, the SSB candidate position 5, the SSB candidate position 9, the SSB candidate position 13 and the SSB candidate position 17. In the SSB candidate positions 0-19, the SSB candidate position with the index for which and 4 (the value of the QCL parameter) the modulo operation results in a reminder of 2 is configured as an SSB candidate position in a third SSB candidate position set corresponding to the beam 3, that is, the SSB candidate position 2, the SSB candidate position 6, the SSB candidate position 10, the SSB candidate position 14 and the SSB candidate position 18. In the SSB candidate positions 0-19, the SSB candidate position with the index for which and 4 (the value of the QCL parameter) the modulo operation results in a reminder of 3 is configured as an SSB candidate position in a fourth SSB candidate position set corresponding to the beam 4, that is, the SSB candidate position 3, the SSB candidate position 7, the SSB candidate position 11, the SSB candidate position 15 and the SSB candidate position 19.

Before signal transmission with the unlicensed spectrum, the device needs to follow a listen-before-talk (LBT) principle, that is, the device needs to perform a channel listening first, for example, a clear channel assessment (CCA), to determine whether the channel of the unlicensed spectrum is occupied, and send a signal through the channel of the unlicensed spectrum when determining that the channel is not occupied. Therefore, before sending the SSB, the access network device also needs to perform the channel listening. When the channel is not occupied, the SSB may be sent at the current SSB candidate position, and when the channel is occupied, the SSB needs to be sent at another SSB candidate position re-selected according to a certain rule. Therefore, the position of sending the burst within each SSB period is not fixed.

In the initial access process, after receiving the SSB, the terminal acquires a physical downlink control channel (PDCCH) associated with remaining minimum system information (RMSI) based on the SSB, and then acquires a physical downlink shared channel (PDSCH) corresponding to the PDCCH to parse the RMSI from the PDSCH data. The RMSI may not be parsed successfully due to its great volume, in this case, the SSB continues to be detected within a next period, so as to acquire the RMSI again based on the detected SSB until the RMSI is parsed successfully. The detection includes but is not limited to receiving the SSB or determining a receiving position of the SSB (that is, an SSB candidate position of sending the SSB) through energy detection.

In the related art, the terminal receives the SSB through a blind detection in the initial access process, and after uplink synchronization is completed based on the received SSB, the terminal may determine the SSB candidate position, that is, the position where the access network device may send the SSB. Since the position of sending by the access network device the SSB within each period is not fixed, the terminal needs to detect at each SSB candidate position so as to obtain a desired signal (for example, the PDCCH associated with the RMSI), so that a number of times of signal detection are required. The PDCCH carrying RMSI control information is searched in a control resource set 0 (COntrol REsource SET #0, CORESET #0), and the detection needs to be performed a plurality of times for one search. When the SSB is detected at each SSB candidate position and the PDCCH is searched, the number of times may multiply.

When the terminal receives the SSB sent by a certain beam, it indicates that the signal of the beam is strong at the terminal, the terminal needs to track the beam and performs signal transmission through the beam to ensure an accuracy of the signal transmission. In the case of beam scanning, a plurality of beams send the SSB at the corresponding SSB candidate position in turn, so that the terminal only needs to detect the SSB at the SSB candidate position corresponding to the beam and receive the desired signal (for example, the PDCCH associated with the RMSI) based on the detected SSB, and needs not to detect the SSB at the SSB candidate positions corresponding to other beams, such that the detection times of the terminal and the power consumption of the terminal may be reduced. Accordingly, in the embodiments of the disclosure, the SSB carries the indication information configured for indicating the QCL parameter, so that the terminal may acquire the indication information from the SSB after receiving the SSB for the first time, and determine an SSB candidate position corresponding to the beam to be tracked based on the indication information in the SSB.

Figure 3:
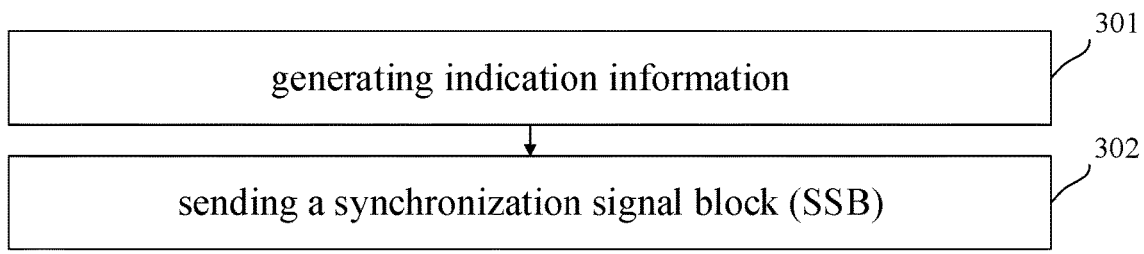
FIG. 3 is a flowchart illustrating a method for transmitting information according to an example embodiment.

FIG. 3 is a flowchart illustrating a method for transmitting information according to an example embodiment. The method may be executed by the access network device in FIG. 1. Referring to FIG. 3, the method includes the following.

At block 301, indication information is generated, and the indication information is configured to indicate a QCL parameter.

At block 302, an SSB is sent, and a physical broadcast channel (PBCH) of the SSB carries the indication information.

In some embodiments of the present disclosure, a value of the QCL parameter may have a one-to-one correspondence with the number of beams that may be used by the access network device, for example, the value of the QCL parameter may be equal to the number of beams, therefore, the indication information may also be configured to indicate the number of beams, that is, the value of the QCL parameter is configured to indicate the number of beams or is associated with the number of beams. For example, the value of the QCL parameter used by the access network device (the value of the QCL parameter) may be 1, 2, 4 or 8, or, may be 2, 4 or 8.

Alternatively, generating the indication information includes: in response to the value of the QCL parameter used by the access network device belonging to a first set, generating first indication information; or, in response to the value of the QCL parameter used by the access network device belonging to a second set, generating second indication information. An intersection of the first set and the second set is empty.

Alternatively, the first set is {8}, the second set is {1, 2, 4}, the value of the QCL parameter indicated by the first indication information is 8, and the value of the QCL parameter indicated by the second indication information is 4. Or the first set is {4, 8}, the second set is {1, 2}, the value of the QCL parameter indicated by the first indication information is 4, and the value of the QCL parameter indicated by the second indication information is 1.

Alternatively, the first indication information and the second indication information are represented by a same bit.

Alternatively, the bit is a bit configured to indicate a remaining minimum system information sub-carrier spacing (RMSI SCS) in a PBCH of a new radio (NR) technology.

Alternatively, sending the SSB includes: in response to monitoring that a channel is idle within an SSB period, sending the SSB at a first SSB candidate position through a first beam. The first beam is one of at least one beam used by the access network device, different beams correspond to different SSB candidate position sets, each SSB candidate position set includes at least one SSB candidate position, and each beam is configured to send the SSB at an SSB candidate position in a respective SSB candidate position set.

Alternatively, when the indication information is the first indication information and the first set is {8}, a modulo operation of an index of each SSB candidate position in the same SSB candidate position set and the value of the QCL parameter indicated by the first indication information results in a same result. Or, when the indication information is the second indication information and the second set is {1, 2, 4}, a modulo operation of an index of each SSB candidate position in the same SSB candidate position set and the value of the QCL parameter indicated by the second indication information results in a same result.

Alternatively, sending by the access network device the SSB further includes: in response to monitoring that the channel is occupied within the SSB period, retrying by the access network device to send the SSB after an interval of n−1 SSB candidate positions, n is equal to the value of the QCL parameter indicated by the indication information; or, in response to monitoring that the channel is occupied within the SSB period, retrying by the access network device to send the SSB at a next SSB candidate position.

It should be noted that, blocks 301-302 and the above alternative operations may be arbitrarily combined.

Figure 4:
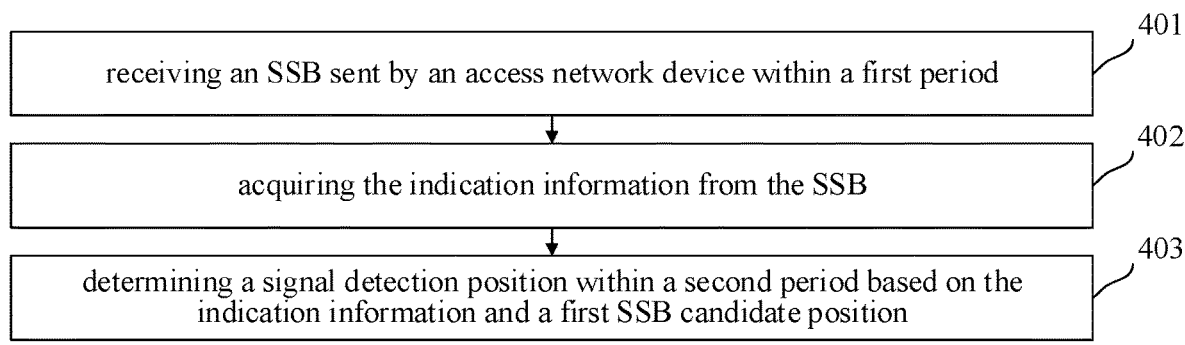
FIG. 4 is a flowchart illustrating a method for transmitting information according to an example embodiment.

FIG. 4 is a flowchart illustrating a method for transmitting information according to an example embodiment. The method may be executed by the terminal in FIG. 1. Referring to FIG. 4, the method includes the following.

At block 401, an SSB sent by an access network device is received within a first period. The SSB carries indication information configured to indicate a QCL parameter.

At block 402, the indication information is acquired from the SSB.

At block 403, a signal detection position within a second period is determined based on the indication information and a first SSB candidate position. The second period is a next period of the first period, and the first SSB candidate position is an SSB candidate position where the SSB is received within the first period.

Alternatively, the indication information is first indication information or second indication information. The first indication information is configured to indicate that a value of the QCL parameter used by the access network device belongs to a first set, and the second indication information is configured to indicate that the value of the QCL parameter used by the access network device belongs to a second set, and an intersection of the first set and the second set is empty.

Alternatively, the first set is {8}, the second set is {1, 2, 4}, the value of the QCL parameter indicated by the first indication information is 8, and the value of the QCL parameter indicated by the second indication information is 4. Or the first set is {4, 8}, the second set is {1, 2}, the value of the QCL parameter indicated by the first indication information is 4, and the value of the QCL parameter indicated by the second indication information is 1.

Alternatively, determining the signal detection position within the second period based on the indication information and the first SSB candidate position includes: determining a plurality of SSB candidate position sets based on the indication information, each SSB candidate position set corresponding to a beam of the access network device, each SSB candidate position set including at least one SSB candidate position, and each beam being configured to send the SSB at an SSB candidate position in a respective SSB candidate position set; and determining all SSB candidate positions in the SSB candidate position set to which the first SSB candidate position belongs as signal detection positions within the second period.

Alternatively, when the indication information is the first indication information, a modulo operation of an index of each SSB candidate position in the SSB candidate position set and a value of the QCL parameter indicated by the first indication information results in a same result. Or, when the indication information is the second indication information, a modulo operation of an index of each SSB candidate position in the SSB candidate position set and the value of the QCL parameter indicated by the second indication information results in a same result.

For example, when the indication information is the first indication information and the first set is {8}, the modulo operation of the index of each SSB candidate position in the SSB candidate position set and 8 results in a same result. Or, when the indication information is the second indication information and the second set is {1, 2, 4}, the modulo operation of the index of each SSB candidate position in the SSB candidate position set and 4 results in a same result. When the indication information is the first indication information and the first set is {4, 8}, the modulo operation of the index of each SSB candidate position in the SSB candidate position set and 4 results in a same result. Or, when the indication information is the second indication information and the second set is {1, 2}, the modulo operation of the index of each SSB candidate position in the SSB candidate position set and 1 results in a same result.

Alternatively, the method further includes: sequentially detecting the SSB at each of determined SSB candidate positions; determining a PDCCH associated with RMSI based on the SSB candidate position where the SSB is detected in response to detecting the SSB at any of the SSB candidate positions; and acquiring the RMSI based on the PDCCH.

It should be noted that, blocks 401-403 and the above alternative operations may be arbitrarily combined.

Figure 5:
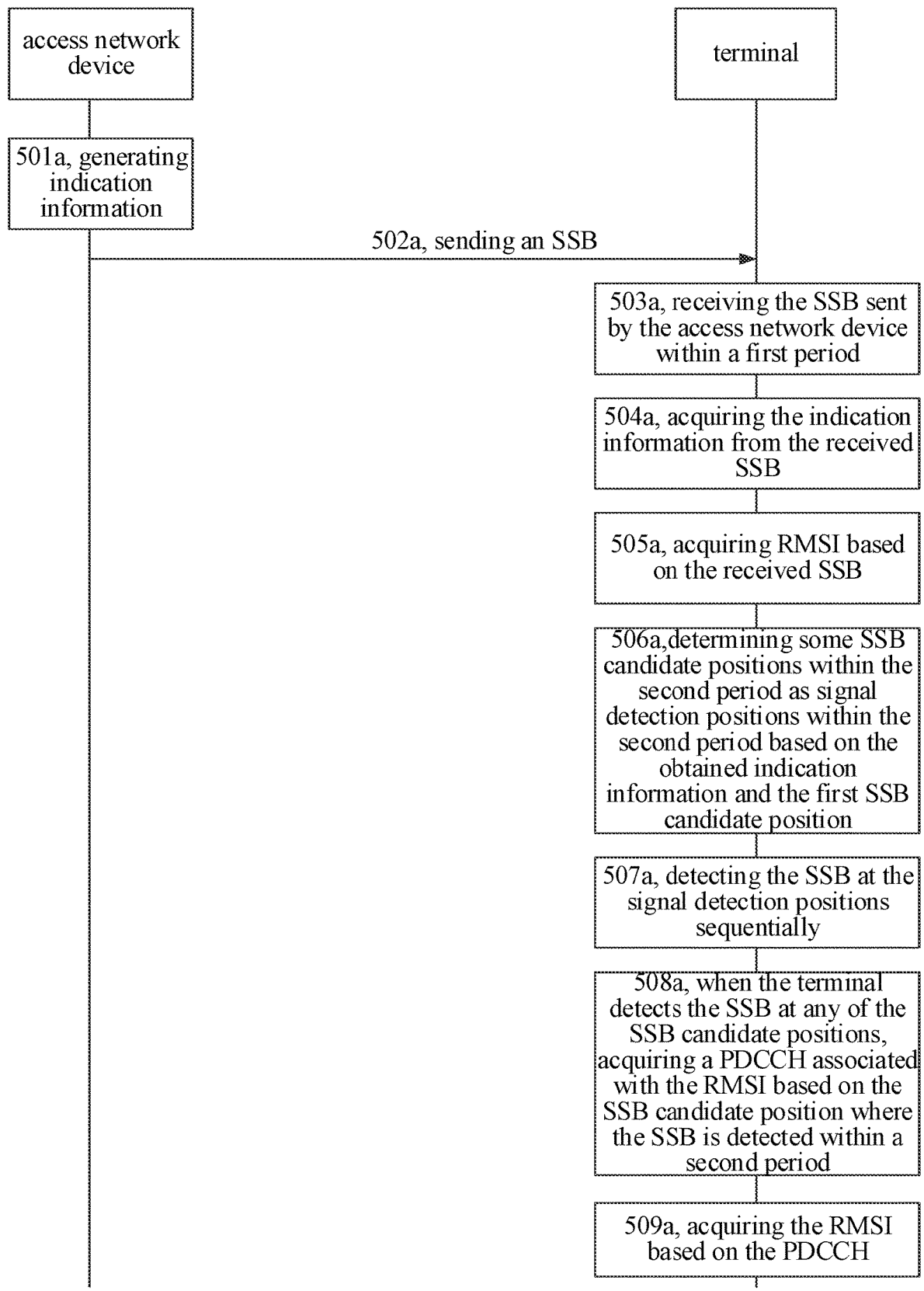
FIG. 5 is a flowchart illustrating a method for transmitting information according to an example embodiment.

FIG. 5 is a flowchart illustrating a method for transmitting information according to an example embodiment. Referring to FIG. 5, the method includes the following.

At block 501a, an access network device generates indication information.

The indication information is configured to indicate a QCL parameter. In some embodiments of the present disclosure, the value of the QCL parameter may have a one-to-one correspondence with the number of beams that may be used by the access network device, for example, the value of the QCL parameter may be equal to the number of beams, therefore, the indication information may also be configured to indicate the number of beams, that is, the value of the QCL parameter is configured to indicate the number of beams or is associated with the number of beams. For example, the value of the QCL parameter used by the access network device (the value of the QCL parameter) may be 1, 2, 4 or 8, or, when the access network device does not use an omni-directional beam, the value of the QCL parameter used by the access network device may be 2, 4 or 8.

Alternatively, block 501a may include: in response to the value of the QCL parameter used by the access network device belonging to a first set, generating first indication information; or, in response to the value of the QCL parameter used by the access network device belonging to a second set, generating second indication information; an intersection of the first set and the second set is empty.

In the embodiment illustrated in FIG. 5, the first set is {8}, the second set is {1, 2, 4}, therefore, if the value of the QCL parameter used by the access network device is 8, and the generated indication information is the first indication information, i.e., the first indication information is configured to indicate that the value of the QCL parameter used by the access network device belongs to the first set. If the value of the QCL parameter used by the access network device is 1 or 2 or 4, and the generated indication information is the second indication information, i.e., the second indication information is configured to indicate that the value of the QCL parameter used by the access network device belongs to the second set.

In this case, for the terminal, the value of the QCL parameter indicated by the first indication information is 8, and the value of the QCL parameter indicated by the second indication information is 4. That is, if the terminal receives the first indication information, it indicates that the value of the QCL parameter used by the access network device belongs to the first set. In this case, the terminal may determine the SSB candidate position set based on that the value of the QCL parameter used by the access network device is 8. If the terminal receives the second indication information, it indicates that the value of the QCL parameter used by the access network device belongs to the second set. In this case, the terminal may determine the SSB candidate position set based on that the value of the QCL parameter used by the access network device is 4. It can be seen that, the value of the QCL parameter indicated by the second indication information may be not equal to the value of the QCL parameter actually used by a base station.

At block 502a, the access network device sends an SSB. The indication information is carried in a PBCH of the SSB.

For example, the first indication information and the second indication information may be represented by one bit. That is, different values of the bit represent different indication information, for example, 0 represents the first indication information, while 1 represents the second indication information. Or 1 represents the first indication information, and 0 represents the second indication information.

In the NR technology, one bit in the PBCH is configured to indicate the RMSI SCS. For the NRU technology, since the subcarrier spacing of the RMSI and that of the SSB are the same, if the terminal knows the subcarrier spacing of the SSB, then the terminal may know the subcarrier spacing of the RMSI, such that it is unnecessary to indicate the RMSI SCS by the bit, therefore, the bit configured to indicate the RMSI SCS in the NR technology may be configured to represent the indication information, that is, the existing vacant bit may be configured to indicate new information without changing a structure of the SSB.

It should be noted that a reserved bit in the PBCH may also be configured to indicate the first indication information and the second indication information. In the PBCH, n consecutive bits may correspond to $2^n$ combinations, for example, 4 bits may correspond to 16 combinations, some of which have been configured to represent a specific meaning, and some others are temporarily unused, here, the reserved bit refers to the unused combination.

The number of SSBs sent by the access network device within one SSB period is the same as the number of used beams. Therefore, when the number of beams used by the access network device is 1, the number of SSBs sent by the access network device is 1; when the number of beams used by the access network device is 2, the number of SSBs sent by the access network device is 2; when the number of beams used by the access network device is 4, the number of SSBs sent by the access network device is 4; and when the number of beams used by the access network device is 8, the number of SSBs sent by the access network device is 8.

For example, the position of sending by the access network device the SSB may also be related to the value of the QCL parameter and/or the number of beams used by the access network device, that is, the SSB candidate positions corresponding to different beams are different. The SSB candidate positions corresponding to one beam are configured as an SSB candidate position set. A same result may be obtained by a certain operation on the index of each SSB candidate position in the SSB candidate position set and the value of the QCL parameter indicated by the indication information. For example, a modulo operation may be performed on the index of the SSB candidate position and the value of the QCL parameter indicated by the indication information. The modulo operation refers to that a remainder obtained by dividing the index of the SSB candidate position by the value of the QCL parameter is determined as a result of the modulo operation.

For example, when the indication information is the first indication information and the first set is {8}, the modulo operation of an index of each SSB candidate position in the same SSB candidate position set and 8 (the value of the QCL parameter indicated by the first indication information) results in a same result; or, when the indication information is the second indication information and the second set is {1, 2, 4}, the modulo operation of an index of each SSB candidate position in the same SSB candidate position set and 4 (the value of the QCL parameter indicated by the second indication information) results in a same result.

For example, block 502a may include: sending by the access network device the SSB at a first SSB candidate position through a first beam in response to monitoring that a channel is idle within an SSB period. The first beam is one of at least one beam used by the access network device, different beams correspond to different SSB candidate position sets, each SSB candidate position set includes at least one SSB candidate position, and each beam is configured to send the SSB at an SSB candidate position in a respective SSB candidate position set.

Alternatively, block 502a may include: in response to monitoring that the channel is occupied within the SSB period, retrying by the access network device to send the SSB after an interval of n−1 SSB candidate positions, n is equal to the value of the QCL parameter indicated by the indication information; or, in response to monitoring that the channel is occupied within the SSB period, retrying by the access network device to send an SSB at a next SSB candidate position.

That is, in one SSB period, the access network device tries to send the SSB starting from the SSB candidate position 0 till the SSB is sent successfully. In this case, trying to send an SSB at the SSB candidate position refers to performing channel listening first, when the channel is not occupied (that is, the channel is idle), sending the SSB at the SSB candidate position by the beam corresponding to the SSB candidate position, and when the channel is occupied, performing channel listening again before a next SSB candidate position or the SSB candidate position behind a preset number of SSB candidate positions arrives, and when the channel is not occupied, sending the SSB at the next SSB candidate position by the beam corresponding to the next SSB candidate position. The preset number may be n−1, where, n is equal to the value of the QCL parameter indicated by the indication information.

When the value of the QCL parameter used by the access network device is 4 or 8, the access network device tries to send the SSB at a plurality of consecutive SSB candidate positions sequentially within one SSB period, till the SSB is sent successfully, that is, when it is monitored that the channel is occupied, the SSB is to be sent at a next SSB candidate position.

For example, taking a 30 KHz SCS for an example, 20 SSB candidate positions are included in 5 ms, and the 20 SSB candidate positions are numbered in an ascending order from 0.

When the value of the QCL parameter used by the access network device is 8, the access network device tries to send SSB0 at the SSB candidate position 0 for the first time, and when the channel is not occupied, the SSB0 is successfully sent at the SSB candidate position 0, and SSB1 is successfully sent at the SSB candidate position 1, . . . , SSB7 is successfully sent at the SSB candidate position 7; when the channel is occupied, it tries to send the SSB1 at the SSB candidate position 1, and when the channel is not occupied, the SSB1 is successfully sent at the SSB candidate position 1, the SSB2 is successfully sent at the SSB candidate position 2, . . . , the SSB0 is successfully sent at the SSB candidate position 8; when the channel is occupied, it tries to send the SSB2 at the SSB candidate position 2, and the subsequent process is similar to the above process, which is omitted here.

When the value of the QCL parameter used by the access network device is 4, the access network device tries to send the SSB0 at the SSB candidate position 0 for the first time, and when the channel is not occupied, the SSB0 is successfully sent at the SSB candidate position 0, and the SSB1 is successfully sent at the SSB candidate position 1, . . . , the SSB3 is successfully sent at the SSB candidate position 3; when the channel is occupied, it tries to send the SSB1 at the SSB candidate position 1, and when the channel is not occupied, the SSB1 is successfully sent at the SSB candidate position 1, the SSB2 is successfully sent at the SSB candidate position 2, the SSB0 is successfully sent at the SSB candidate position 4; when the channel is occupied, it tries to send the SSB2 at the SSB candidate position 2, and the subsequent process is similar to the above process, which is omitted here.

When the value of the QCL parameter used by the access network device is 1 or 2, that is, the value of the QCL parameter used by the access network device belongs to the second set, in this case, the indication information sent by the access network device is the second indication information, that is, the value of the QCL parameter indicated by the second indication information is 4, the access network device attempts to send the SSB at a plurality of SSB candidate positions sequentially with three candidate positions as an interval within one SSB period, till the SSB is sent successfully.

Taking a 30 KHz SCS for an example, 20 SSB candidate positions are included in 5 ms, and the 20 SSB candidate positions are numbered in an ascending order from 0.

When the value of the QCL parameter used by the access network device is 2, the access network device tries to send the SSB0 at the SSB candidate position 0 for the first time, and when the channel is not occupied, the SSB0 is successfully sent at the SSB candidate position 0, and the SSB1 is successfully sent at the SSB candidate position 1; when the channel is occupied, it tries to send the SSB0 at the SSB candidate position 4, and when the channel is not occupied, the SSB0 is successfully sent at the SSB candidate position 4, and the SSB1 is successfully sent at the SSB candidate position 5; when the channel is occupied, it tries to send the SSB0 at the SSB candidate position 8, and the subsequent process is similar to the above process, which is omitted here. It can be seen that, the SSB candidate positions of sending the SSB0 are the SSB candidate position 0, the SSB candidate position 4, the SSB candidate position 8, the SSB candidate position 12, and the SSB candidate position 16. Three SSB candidate positions are spaced between the SSB candidate position 0 and the SSB candidate position 4, and three SSB candidate positions are spaced between the SSB candidate position 4 and the SSB candidate position 8.

When the value of the QCL parameter used by the access network device is 1, the access network device tries to send the SSB0 at the SSB candidate position 0 for the first time, and when the channel is not occupied, the SSB0 is successfully sent at the SSB candidate position 0; when the channel is occupied, it tries to send the SSB0 at the SSB candidate position 4, and when the channel is not occupied, the SSB0 is successfully sent at the SSB candidate position 4; when the channel is occupied, it tries to send the SSB0 at the SSB candidate position 8, and the subsequent process is similar to the above process, which is omitted here. It can be seen that, the SSB candidate positions of sending the SSB0 are the SSB candidate position 0, the SSB candidate position 4, the SSB candidate position 8, the SSB candidate position 12, and the SSB candidate position 16. Three SSB candidate positions are spaced between the SSB candidate position 0 and the SSB candidate position 4, and three SSB candidate positions are spaced between the SSB candidate position 4 and the SSB candidate position 8, that is, the preset interval is three SSB candidate positions.

In the related art, when the value of the QCL parameter used by the access network device is 1 or 2, the access network device tries to send the SSB at a next SSB candidate position when failing to send the SSB at an SSB candidate position. Compared with the related art, in the embodiments, when the value of the QCL parameter used by the access network device is 1 or 2, it retries to send the SSB after an interval of three SSB candidate positions when the current channel is occupied.

It should be noted that, in another possible implementation, when the value of the QCL parameter used by the access network device is 1 or 2, the access network device may try to send the SSB at a plurality of consecutive SSB candidate positions sequentially within one SSB period, till the SSB is sent successfully, that is, in the same way which is used in the related art.

It should be noted that in the embodiments of the present disclosure, SSBn represents the SSB sent by an (n−1)-th beam, for example, SSB0 represents the SSB sent by the first beam, SSB1 represents the SSB sent by the second beam, and so forth.

At block 503a, a terminal receives the SSB sent by the access network device within a first period.

The SSB carries the indication information configured to indicate the QCL parameter.

When the terminal is not resident or accessed to a certain cell, for example, when the terminal is just powered on, the terminal may receive the SSB. The first period may be a first period during which the terminal starts to receive a signal after being powered on, in this case, the terminal needs to perform a blind detection till the SSB is received. The first period refers to a period of sending a discovery reference signal tacitly approved by the terminal.

After receiving an SSB, the terminal may parse the SSB, and synchronize time and frequency with the access network device based on the PSS and the SSS in the SSB, and the terminal may decode the PBCH by means of the DMRS in the SSB to acquire system information carried on the PBCH. The system information is system information required by the terminal to access the access network device. When the terminal synchronizes with the access network device, the terminal may determine an index of the SSB candidate position where the SSB is received.

At block 504a, the terminal acquires the indication information from the received SSB.

The relevant descriptions of the indication information may refer to block 501a.

At block 505a, the terminal acquires the RMSI based on the received SSB. Due to a limited capacity of the PBCH, the system information included in the SSB is only a part of all system information required by the terminal to randomly access the access network device, which may include a master information block (MIB), and the other part of the all system information required by the terminal to access the access network device is included in the RMSI, the RMSI is periodically sent by the access network device, and the RMSI is transmitted through the PDSCH. Therefore, in order to achieve the initial access, the terminal further needs to determine a time domain position of the CORESET of the PDCCH associated with the RMSI based on the time domain position corresponding to the SSB, searches the PDCCH associated with the RMSI in the CORESET, and acquires the RMSI in the PDSCH based on control information in the searched PDCCH. After acquiring the system information in the SSB and the RMSI, the terminal may access a network based on the system information in the SSB and the RMSI. The PDCCH associated with the RMSI refers to the PDCCH carrying RMSI control information.

Alternatively, after the PDCCH is acquired, the RMSI control information in the PDCCH may not be parsed. In this case, the parsed RMSI control information needs to be saved and block 506*a* is executed.

At block 506*a*, the terminal determines some SSB candidate positions within the second period as signal detection positions within the second period based on the obtained indication information and the first SSB candidate position.

The first SSB candidate position is the SSB candidate position where the SSB is received within the first period. The second period is a next period of the first period.

Alternatively, block 506*b* may include the following.

First, a plurality of SSB candidate position sets are determined based on the indication information, each SSB candidate position set corresponding to one beam of the access network device, each SSB candidate position set including at least one SSB candidate position, and each beam being configured to send the SSB at an SSB candidate position in a respective SSB candidate position set.

Second, all SSB candidate positions in the SSB candidate position set to which the first SSB candidate position belongs are determined as the signal detection positions within the second period.

For example, when the obtained indication information is the first indication information and the first set is {8}, the modulo operation of the index of each SSB candidate position in the SSB candidate position set and 8 results in a same result, so that a plurality of SSB candidate position sets may be obtained, and then all SSB candidate positions in the SSB candidate position set to which the first SSB candidate position belongs are determined as the signal detection positions within the second period. For example, when the first SSB candidate position where the SSB is received within the first period is the SSB candidate position 0, the signal detection positions within the second period are the SSB candidate position 0, the SSB candidate position 8, and the SSB candidate position 16; when the first SSB candidate position where the SSB is received within the first period is the SSB candidate position 1, the signal detection positions within the second period are the SSB candidate position 1, the SSB candidate position 9, and the SSB candidate position 17; when the first SSB candidate position where the SSB is received within the first period is the SSB candidate position 8, the signal detection positions within the second period are the SSB candidate position 0, the SSB candidate position 8 and the SSB candidate position 16; and when the first SSB candidate position where the SSB is received within the first period is the SSB candidate position 5, the signal detection positions within the second period are the SSB candidate position 5 and the SSB candidate position 13. The terminal performs one detection at one signal detection position, such that the terminal only needs to perform two or three detections within a next period when the indication information is the first indication information.

When the obtained indication information is the second indication information and the second set is {1, 2, 4}, the modulo operation of the index of each SSB candidate position in the SSB candidate position set and 4 results in a same result, so that a plurality of SSB candidate position sets may be obtained, and then all SSB candidate positions in the SSB candidate position set to which the first SSB candidate position belongs are determined as the signal detection positions within the second period. For example, when the first SSB candidate position where the SSB is received within the first period is the SSB candidate position 0, the signal detection positions within the second period are the SSB candidate position 0, the SSB candidate position 4, the SSB candidate position 8, the SSB candidate position 12 and the SSB candidate position 16; when the first SSB candidate position where the SSB is received within the first period is the SSB candidate position 8, the signal detection positions within the second period are the SSB candidate position 1, the SSB candidate position 8, and the SSB candidate position 16; when the first SSB candidate position where the SSB is received within the first period is the SSB candidate position 5, the signal detection positions within the second period are the SSB candidate position 5 and the SSB candidate position 13. The terminal performs one detection at one signal detection position, such that the terminal only needs to perform 5-6 detections within a next period when the indication information is the second indication information.

Compared with performing detections at all SSB candidate positions (that is, 20 detections need to be performed at 20 SSB candidate positions) in the related art, the above two situations may dramatically reduce detection times of the terminal.

At block 507*a*, the terminal detects the SSB at the signal detection positions sequentially.

That is, the SSB is detected at the SSB candidate positions determined as the signal detection positions sequentially in an ascending order of the index of the SSB candidate position.

The signals received at the SSB candidate positions in the same SSB candidate position set are QCL signals, that is, the signals transmitted by the same beam are the QCL signals. The QCL signals refer to signals with the same large-scale characteristic. The large-scale characteristic includes but is not limited to delay spread, Doppler spread, Doppler frequency shift, average channel gain, average latency, etc.

Alternatively, the RMSI may further include related information of the SSBs sent by the access network device within the SSB period, for example, the number of SSBs. For example, the number may be represented by a bitmap in the RMSI in the NR technology. The bitmap includes a plurality of bits, and the number of consecutive 1-bits in the string of bits is the number of SSBs. Since the number of SSBs is equal to the number of beams, the number of SSBs is also equal to the value of the QCL parameter. For example, the string of bits is 11110000, in the NR technology, it indicates that the access network device has sent SSBs 0-3 and not sent SSBs 4-7. In the embodiments of the disclosure, it indicates that the access network device has sent 4 SSBs, that is, the value of the QCL parameter is 4. By including the number of SSBs sent by the access network device within the SSB period in the RMSI, the terminal may know the number of SSBs sent by the access network device within the SSB period after receiving the RMSI, and the terminal may perform rate matching based on the number.

At block 508*a*, when the terminal detects the SSB at any of the SSB candidate positions, the terminal acquires a PDCCH associated with the RMSI based on the SSB candidate position where the SSB is detected within the second period.

Since the PDCCH associated with the RMSI is correlated with the time domain position of the SSB, that is, the time domain position of the CORESET of the PDCCH associated with the RMSI is the same as the SSB candidate position where the SSB is detected within the second period, the time domain position of the CORESET of the PDCCH associated with the RMSI may be determined without parsing the SSB and the PDCCH associated with the RMSI may be obtained by searching in the CORESET. The PDCCH associated with the RMSI refers to the PDCCH carrying RMSI control information.

Alternatively, acquiring the PDCCH associated with the RMSI includes: performing combined decoding on the PDCCH acquired in block 508a and the PDCCH acquired in block 505a. Alternatively, combining adopted in the combined decoding may be soft combining, which is not limited here. The manner of combined decoding may improve an acquiring efficiency of the control information in the PDCCH in the case of poor channel quality.

Alternatively, before combined decoding, the method may further include: performing independent decoding on the PDCCH acquired within the second period, and when the decoding fails, performing the combined decoding. When decoding is successful, it is not necessary to perform the combined decoding.

It should be noted that, when the PDCCH still may not be decoded in block 508a, the SSB candidate position of the same signal detection position within the second period may be configured as a signal detection position within the third period. Repeat blocks 507a and 508a within the third period, and when the PDCCH is successfully decoded within the third period, execute block 509a.

At block 509a, the RMSI is acquired based on the PDCCH.

The PDCCH carries control information indicating a PDSCH of the RMSI, therefore, block 509a includes: acquiring the control information in the PDCCH from the PDCCH, and acquiring the RMSI from the corresponding PDSCH based on the control information.

In the embodiments of the disclosure, the SSB carries the indication information including the QCL parameter, so that the terminal may know the QCL parameter used by the access network device. Based on the value of the QCL parameter indicated by the indication information and the SSB candidate position where the SSB is received by the terminal for the first time, the terminal may determine the signal detection position within a next period, and further detect the SSB at some SSB candidate positions within the next period, so that the detection times of the terminal may be reduced.

The indication information may be carried by multiplexing the existing bits of the PBCH in the NR technology without adding a load of the PBCH, with good compatibility with the NR technology.

Figure 6:
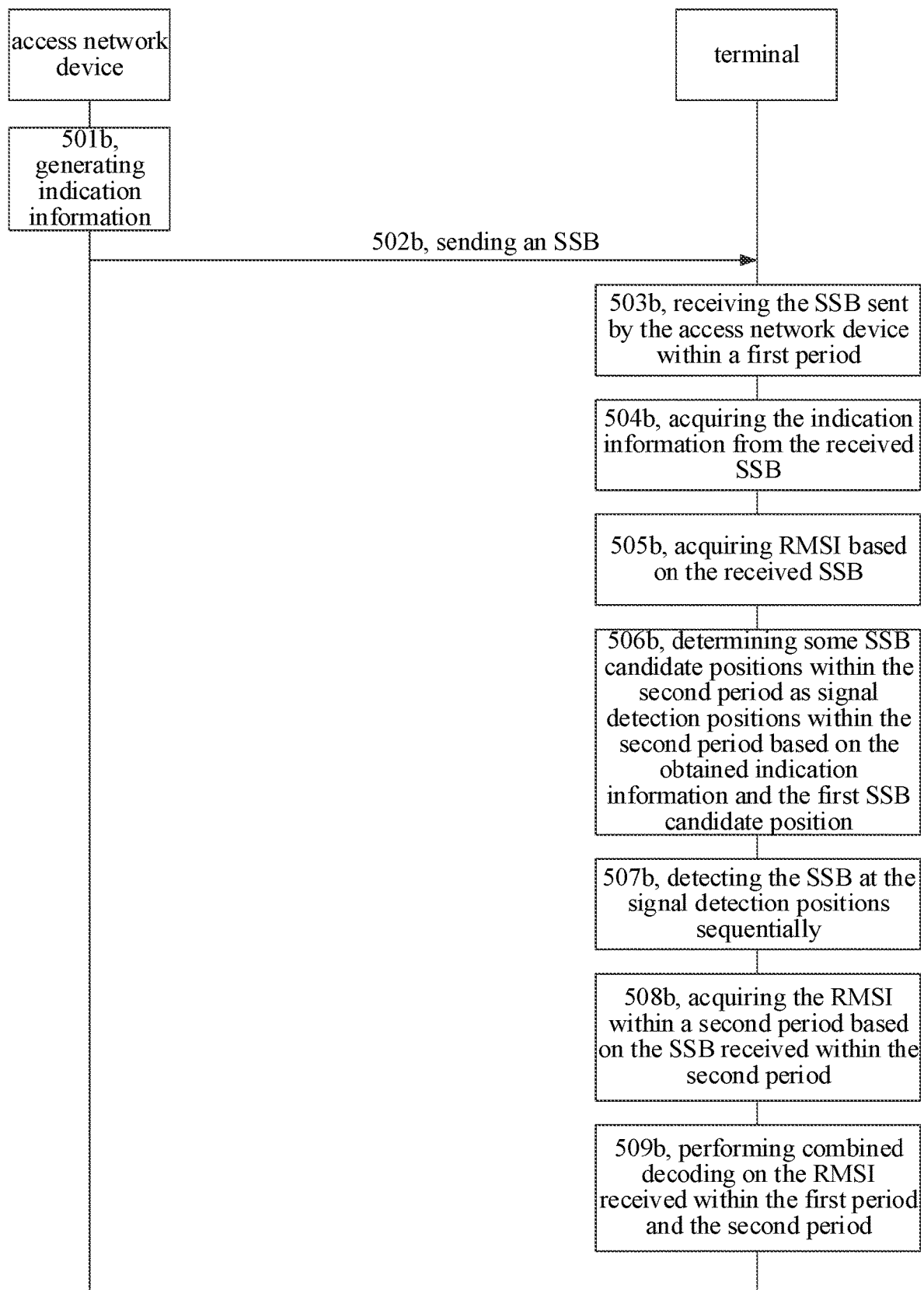
FIG. 6 is a flowchart illustrating a method for transmitting information according to an example embodiment.

FIG. 6 is a flowchart illustrating a method for transmitting information according to an example embodiment. Referring to FIG. 6, the method includes the following.

At block 501b, an access network device generates indication information. The relevant descriptions of the indication information may refer to block 501a, which will not be repeated here.

In the embodiment, the first set is {4, 8}, the second set is {1, 2}, in this case, for the terminal, the value of the QCL parameter indicated by the first indication information is 4, and the value of the QCL parameter indicated by the second indication information is 1. That is, if the terminal receives the first indication information, it indicates that the value of the QCL parameter used by the access network device belongs to the first set, but the terminal may determine the SSB candidate position set based on that the value of the QCL parameter used by the access network device is 4. If the terminal receives the second indication information, it indicates that the value of the QCL parameter used by the access network device belongs to the second set, but the terminal may determine the SSB candidate position set based on that the value of the QCL parameter used by the access network device is 1.

At block 502b, the access network device sends an SSB. The indication information is carried in a PBCH of the SSB.

The carrying way of the indication information and the sending way of the SSB may refer to block 502a, which will be omitted here. It should be noted that, in the embodiments, in response to monitoring that the channel is occupied, the access network device retries to send the SSB at a next SSB candidate position.

At block 503b, the terminal receives the SSB sent by the access network device within a first period.

When the terminal is not resident or accessed to a certain cell, for example, when the terminal is just powered on, the terminal may receive the SSB. The first period may be a first period during which the terminal starts to receive a signal after being powered on, in this case, the terminal needs to perform a blind detection till the SSB is received.

After receiving the SSB, the terminal may parse the SSB, and synchronize time and frequency with the access network device based on the PSS and the SSS in the SSB, and then the terminal may decode the PBCH by means of the DMRS in the SSB to obtain system information carried on the PBCH. The system information is system information required by the terminal to access the access network device. When the terminal synchronizes with the access network device, the terminal may determine an index of the SSB candidate position where the SSB is received.

At block 504b, the terminal acquires the indication information from the received SSB.

The relevant descriptions of the indication information may refer to block 501b.

At block 505b, the terminal acquires RMSI based on the received SSB. The implementation of block 505b may refer to block 505a.

At block 506b, the terminal determines some SSB candidate positions within the second period as signal detection positions within the second period based on the obtained indication information and the first SSB candidate position.

The first SSB candidate position is the SSB candidate position where the SSB is received within the first period. The second period is a next period of the first period.

Alternatively, block 506b may include the following.

First, a plurality of SSB candidate position sets are determined based on the indication information, each SSB candidate position set corresponding to one beam of the access network device, each SSB candidate position set including at least one SSB candidate position, and each beam being configured to send the SSB at an SSB candidate position in a respective SSB candidate position set.

Second, all SSB candidate positions in the SSB candidate position set to which the first SSB candidate position belongs are determined as the signal detection positions within the second period.

For example, when the obtained indication information is first indication information and the first set is {8}, a modulo operation of an index of each SSB candidate position in the SSB candidate position set and 4 (the value of the QCL parameter indicated by the first indication information) results in a same result, so that a plurality of SSB candidate position sets may be obtained, and then all SSB candidate positions in the SSB candidate position set to which the first SSB candidate position belongs are determined as the signal detection positions within the second period. For example, when the first SSB candidate position where the SSB is received within the first period is the SSB candidate position 0, the signal detection positions within the second period are the SSB candidate position 0, the SSB candidate position 4, the SSB candidate position 8, the SSB candidate position 12 and the SSB candidate position 16; when the first SSB candidate position where the SSB is received within the first period is the SSB candidate position 8, the signal detection positions within the second period are the SSB candidate position 1, the SSB candidate position 8, and the SSB candidate position 16; when the first SSB candidate position where the SSB is received within the first period is the SSB candidate position 5, the signal detection positions within the second period are the SSB candidate position 5 and the SSB candidate position 13. The terminal performs one detection at one signal detection position, such that the terminal only needs to perform 5-6 detections within a next period when the indication information is the first indication information.

When the obtained indication information is second indication information, since the value of the QCL parameter indicated by the second indication information is 1, and the results of the module operation of all integers and 1 are equal, all SSB candidate positions belong to the same set. In this case, all SSB candidate positions within the second period are determined as the signal detection positions.

Compared with performing detection at all SSB candidate positions (that is, 20 detections need to be performed at 20 SSB candidate positions) in the related art, the above situation may still reduce detection times of the terminal.

At block 507b, the terminal detects the SSB at the signal detection positions sequentially.

At block 508b, when the terminal detects the SSB at any of the SSB candidate positions, the terminal acquires a PDCCH associated with RMSI based on the SSB candidate position where the SSB is detected within the second period.

At block 509b, the RMSI is acquired based on the PDCCH.

The implementation of blocks 507b-509b may refer to blocks 507a-509a, which will be omitted here.

In the embodiments of the disclosure, the SSB carries the indication information indicating the value of the QCL parameter used by the access network device, so that the terminal may know the beam used by the access network device. Based on the indication information and the SSB candidate position where the SSB is received by the terminal for the first time, the terminal may determine a signal detection position within a next period, and further detect the SSB at some SSB candidate positions within the next period, so that the detection times of the terminal may be reduced.

The indication information may be carried by multiplexing the existing bits of the PBCH in the NR technology without adding a load of the PBCH, with good compatibility with the NR technology.

In addition, in the embodiment as illustrated in FIG. 6, the position where the access network device tries to send the SSB remains unchanged, which reduces a change of the access network device, easy to implement.

The apparatus embodiments of the disclosure are described below, and the details not described in the apparatus embodiments may refer to the method embodiments.

Figure 7:
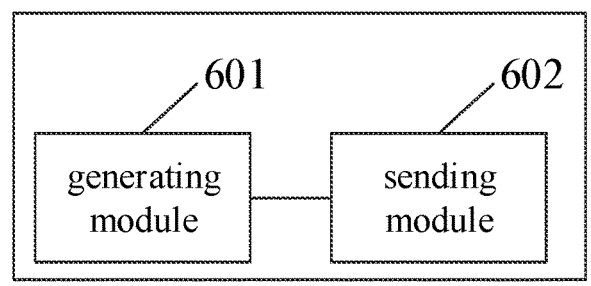
FIG. 7 is a block diagram illustrating an apparatus for transmitting information according to an example embodiment.

FIG. 7 is a block diagram illustrating an apparatus for transmitting information according to an example embodiment. The apparatus has a function of implementing the above method examples, and the function may be achieved by hardware, or by executing corresponding software with the hardware. Referring to FIG. 7, the apparatus for transmitting information includes a generating module 601 and a sending module 602.

The generating module 601 is configured to generate indication information. The indication information is configured to indicate a QCL parameter. The sending module 602 is configured to send a synchronization signal block (SSB) carrying the indication information.

Alternatively, the generating module 601 is configured to: generate first indication information in response to a value of the QCL parameter used by the access network device belonging to a first set; or, generate second indication information in response to a value of the QCL parameter used by the access network device belonging to a second set. An intersection of the first set and the second set is empty.

Alternatively, the first set is {8}, the second set is {1, 2, 4}, the value of the QCL parameter indicated by the first indication information is 8, and the value of the QCL parameter indicated by the second indication information is 4; or the first set is {4, 8}, the second set is {1, 2}, the value of the QCL parameter indicated by the first indication information is 4, and the value of the QCL parameter indicated by the second indication information is 1.

Alternatively, the first indication information and the second indication information are represented by a same bit.

Alternatively, the bit is a bit configured to indicate a remaining minimum system information sub-carrier spacing (RMSI SCS) in a PBCH of a new radio (NR).

Alternatively, the sending module 602 is configured to: send the SSB at a first SSB candidate position through a first beam in response to monitoring that a channel is idle within an SSB period, in which the first beam is one of at least one beam used by the access network device, different beams correspond to different SSB candidate position sets, each SSB candidate position set includes at least one SSB candidate position, and each beam is configured to send the SSB at an SSB candidate position in a respective SSB candidate position set.

Alternatively, when the indication information is the first indication information, a modulo operation of an index of each SSB candidate position in the same SSB candidate position set and the value of the QCL parameter indicated by the first indication information results in a same result; or, when the indication information is the second indication information, a modulo operation of an index of each SSB candidate position in the same SSB candidate position set and the value of the QCL parameter indicated by the second indication information results in a same result.

Alternatively, the sending module 602 is further configured to: retry by the access network device to send the SSB after an interval of n−1 SSB candidate positions in response to monitoring that the channel is occupied within the SSB period, in which n is equal to the value of the QCL parameter indicated by the indication information; or, retry by the access network device to send the SSB at a next SSB candidate position in response to monitoring that the channel is occupied within the SSB period.

Figure 8:
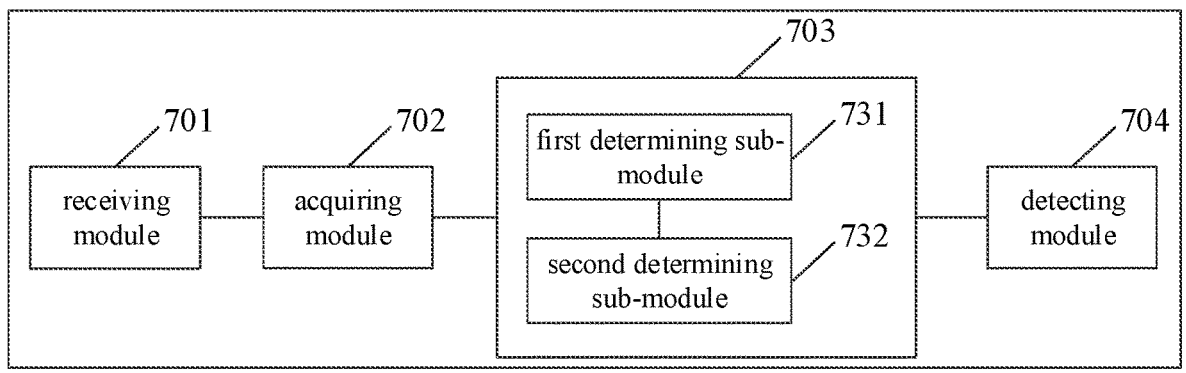
FIG. 8 is a block diagram illustrating an apparatus for transmitting information according to an example embodiment.

FIG. 8 is a block diagram illustrating a structure of an apparatus for transmitting information according to an example embodiment. The apparatus has a function of implementing the above method examples, and the function may be achieved by hardware, or by executing corresponding software with the hardware. Referring to FIG. 8, the apparatus for transmitting information includes a receiving module 701, an acquiring module 702 and a determining module 703.

The receiving module 701 is configured to receive a synchronization signal block (SSB) sent by an access network device within a first period, the SSB carries indication information configured to indicate a value of a QCL parameter used by the access network device. The acquiring module 702 is configured to acquire the indication information from the SSB. The determining module 703 is configured to determine a signal detection position within a second period based on the indication information and a first SSB candidate position, the second period is a next period of the first period, and the first SSB candidate position is an SSB candidate position where the SSB is received within the first period.

Alternatively, the indication information is first indication information or second indication information, the first indication information is generated by the access network device in response to a value of the QCL parameter used by the access network device belonging to a first set, and the second indication information is generated by the access network device in response to the value of the QCL parameter used by the access network device belonging to a second set, and an intersection of the first set and the second set is empty.

Alternatively, the first set is {8}, the second set is {1, 2, 4}, the value of the QCL parameter indicated by the first indication information is 8, and the value of the QCL parameter indicated by the second indication information is 4; or the first set is {4, 8}, the second set is {1, 2}, the value of the QCL parameter indicated by the first indication information is 4, and the value of the QCL parameter indicated by the second indication information is 1.

Alternatively, the determining module 703 includes: a first determining sub-module 731, configured to determine a plurality of SSB candidate position sets based on the indication information, each SSB candidate position set corresponding to a beam of the access network device, each SSB candidate position set including at least one SSB candidate position, and each beam being configured to send the SSB at an SSB candidate position in a respective SSB candidate position set; and a second determining sub-module 732, configured to determine all SSB candidate positions in the SSB candidate position set to which the first SSB candidate position belongs as signal detection positions within the second period.

Alternatively, when the indication information is the first indication information, a modulo operation of an index of each SSB candidate position in the SSB candidate position set and the value of the QCL parameter indicated by the first indication information results in a same result; or, when the indication information is the second indication information, a modulo operation of an index of each SSB candidate position in the SSB candidate position set and the value of the QCL parameter indicated by the second indication information results in a same result.

Alternatively, the apparatus further includes: a detecting module 704, configured to sequentially detect the SSB at each of determined SSB candidate positions.

The determining module 703 is further configured to determine a PDCCH associated with RMSI based on the SSB candidate position where the SSB is detected in response to detecting the SSB at any of the determined SSB candidate positions.

The acquiring module 702 is further configured to acquire the RMSI based on the PDCCH.

Figure 9:
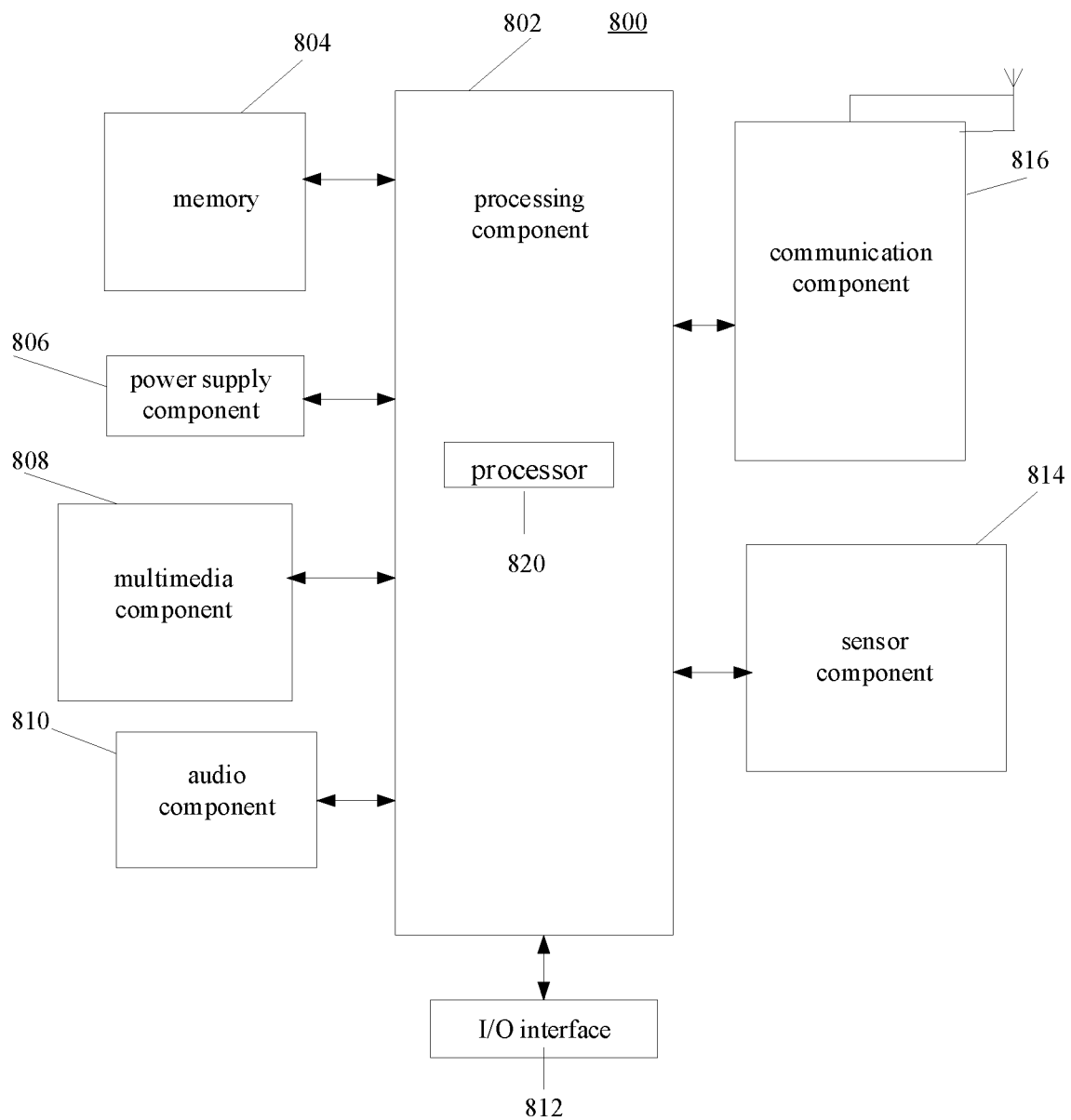
FIG. 9 is a block diagram illustrating an apparatus for transmitting information according to an example embodiment.

FIG. 9 is a block diagram illustrating an apparatus 800 for transmitting information according to an example embodiment. The apparatus 600 may be the terminal. Referring to FIG. 9, the apparatus 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the overall operation of the apparatus 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the apparatus 800. Examples of the data include the instructions of any applications or methods operated on the apparatus 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power supply for all components of the apparatus 800. The power supply component 806 may include a power supply management system, one or more power supplies, and other components related to generating, managing and distributing power for the apparatus 800.

The multimedia component 808 includes a screen of an output interface provided between the apparatus 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the apparatus 800 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 810 is configured to output and/or input a signal. For example, the audio component 810 includes a microphone (MIC). When the apparatus 800 is in an operation mode, such as a call mode, a record mode, and a speech recognition mode, the microphone is configured to receive an external audio signal. The audio signal received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors configured to provide various aspects of status assessments for the apparatus 800. For example, the sensor component 814 may detect the on/off state of the apparatus 800 and the relative positioning of the component, for example, the component is a display and a keypad of the apparatus 800. The sensor component 814 may further detect the position change of the apparatus 800 or one component of the apparatus 800, the presence or absence of contact between the user and the apparatus 800, the orientation or acceleration/deceleration of the apparatus 800, and the temperature change of the apparatus 800. The sensor component 814 may include a proximity sensor configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wireless communication between the apparatus 800 and other devices. In embodiments of the disclosure, the communication component 816 may access wireless networks based on communication standard, such as 2G, 3G, 4G or 5G, or their combination to achieve random access. In an example embodiment, the communication component 816 receives a broadcast signal or broadcast-related information from an external broadcast management system via a broadcast channel In at least one embodiment, the communication component 816 may further include an NFC module.

In an example embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to execute the above method for transmitting information.

In an example embodiment, a non-temporary computer readable storage medium is further provided which includes instructions, such as the memory 804 including instructions, the instructions may be executed by the processor 820 of the apparatus 800 to execute the above method for transmitting information. For example, the non-transitory computer readable storage medium may be a ROM, a random access memory (RANI), a CD-ROM, a magnetic tape, a floppy disk, an optical data storage device, etc.

Figure 10:
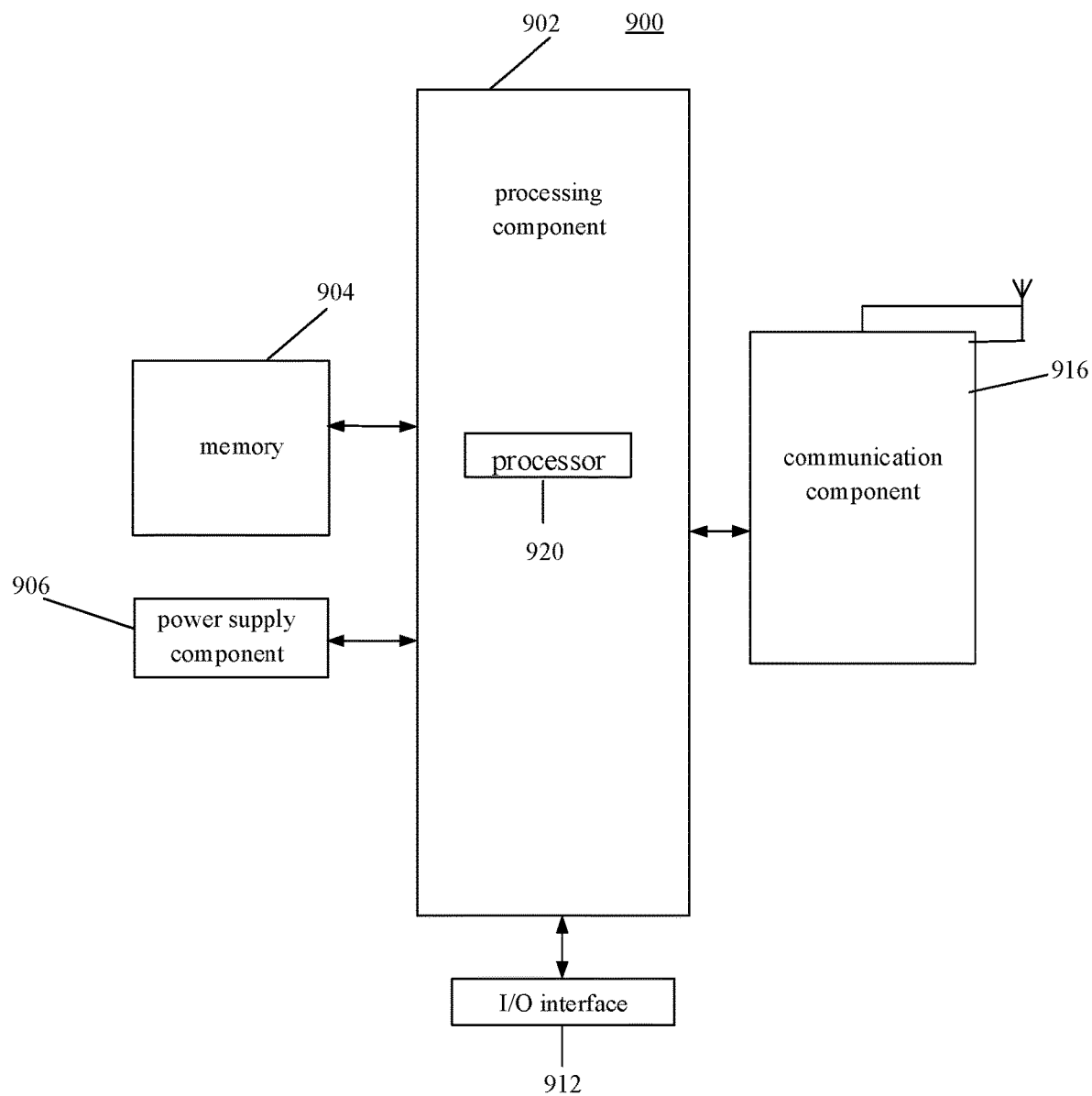
FIG. 10 is a block diagram illustrating an apparatus for transmitting information according to an example embodiment.

FIG. 10 is a block diagram illustrating an access network device 900 according to an example embodiment. Referring to FIG. 10, the access network device 900 may include one or more components: a processing component 902, a memory 904, a power supply component 906, an input/output (I/O) interface 912 and a communication component 916.

The processing component 902 generally controls the overall operation of the access network device. The processing component 902 may include one or more processors 820 to perform instructions, to complete all or part of blocks of the above method. In addition, the processing component 902 may include one or more modules for the convenience of interaction between the processing component 902 and other components.

The memory 904 is configured to store all types of data to support the operation of the access network device 900. Examples of the data include the instructions of any applications or methods operated on the access network device 900. The memory 904 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 906 may provide power supply for all components of the access network device 900. The power supply component 906 may include a power supply management system, one or more power supplies, and other components related to generating, managing and distributing power for the access network device 900.

The I/O interface 912 provides an interface for the processing component 902 and the peripheral interface module, and the peripheral interface module may be a keyboard, a click wheel, a button, etc. The buttons may include but not limited to a home button, a volume button, a start button and a lock button.

The communication component 916 is configured for wireless communication between the access network device and other devices. In embodiments of the disclosure, the communication component 916 may provide a wireless network based on communication standard, such as 2G, 3G, 4G or 5G, or their combination to connect a terminal device.

In an example embodiment, the access network device 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components.

In an example embodiment, a non-temporary computer readable storage medium including instructions is further provided, such as a memory 904 including instructions, the instructions may be executed by the processor 920 of the apparatus 900 to execute the above method for transmitting information. For example, the non-transitory computer readable storage medium may be a ROM, a random access memory (RANI), a CD-ROM, a magnetic tape, a floppy disk, an optical data storage device, etc.

One example embodiment of the disclosure further provides a system for transmitting information. The system for transmitting information includes an access network device and a terminal. The terminal is an apparatus for transmitting information in embodiments as illustrated in FIG. 9. The access network device is an apparatus for transmitting information in embodiments as illustrated in FIG. 10.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for transmitting information, comprising:
generating by an access network device indication information, wherein the indication information is configured to indicate a quasi co-located (QCL) parameter; and
sending by the access network device a synchronization signal block (SSB), wherein a physical broadcast channel (PBCH) of the SSB carries the indication information, wherein the indication information is configured to instruct a terminal to determine an SSB candidate position corresponding to a beam to be tracked based on the indication information in the SSB;
wherein, generating by the access network device the indication information comprises one of the following:
generating by the access network device first indication information in response to a value of the QCL parameter used by the access network device belonging to a first set;
and,
generating by the access network device second indication information in response to a value of the QCL parameter used by the access network device belonging to a second set;
wherein, an intersection of the first set and the second set is empty;
wherein, the first set is {8}, the second set is {1, 2, 4}, the value of the QCL parameter indicated by the first indication information is 8, and the value of the QCL parameter indicated by the second indication information is 4.

2. The method of claim 1, wherein, the first indication information and the second indication information are represented by a same bit.

3. The method of claim 2, wherein, the bit is a bit configured to indicate a remaining minimum system information sub-carrier spacing (RMSI SCS) in a PBCH of a new radio (NR) technology.

4. The method of claim 1, wherein, sending by the access network device the SSB comprises:
sending by the access network device the SSB at a first SSB candidate position through a first beam in response to monitoring that a channel is idle within an SSB period, wherein, the first beam is one of at least one beam used by the access network device, different beams correspond to different SSB candidate position sets, each SSB candidate position set comprises at least one SSB candidate position, and each beam is configured to send the SSB at an SSB candidate position in a respective SSB candidate position set.

5. The method of claim 4, wherein,
when the indication information is the first indication information, a modulo operation of an index of each SSB candidate position in the same SSB candidate position set and the value of the QCL parameter indicated by the first indication information results in a same result.

6. The method of claim 4, wherein, sending by the access network device the SSB further comprises one of the following:
retrying by the access network device to send the SSB after an interval of n−1 SSB candidate positions in response to monitoring that the channel is occupied within the SSB period, wherein, n is equal to the value of the QCL parameter indicated by the indication information;
and,
retrying by the access network device to send the SSB at a next SSB candidate position in response to monitoring that the channel is occupied within the SSB period.

7. The method of claim 4, wherein,
when the indication information is the second indication information, a modulo operation of an index of each SSB candidate position in the same SSB candidate position set and the value of the QCL parameter indicated by the second indication information results in a same result.

8. A method for transmitting information, comprising:
receiving by a terminal a synchronization signal block (SSB) sent by an access network device within a first period, wherein, the SSB carries indication information configured to indicate a quasi co-located (QCL) parameter;
acquiring by the terminal the indication information from the SSB, wherein the indication information is configured to instruct a terminal to determine an SSB candidate position corresponding to a beam to be tracked based on the indication information in the SSB; and
determining by the terminal a signal detection position within a second period based on the indication information and a first SSB candidate position, wherein, the second period is a next period of the first period, and the first SSB candidate position is an SSB candidate position where the SSB is received within the first period;
wherein, the indication information is first indication information or second indication information, the first indication information is generated by the access network device in response to a value of the QCL parameter used by the access network device belonging to a first set, and the second indication information is generated by the access network device in response to the value of the QCL parameter used by the access network device belonging to a second set, and an intersection of the first set and the second set is empty;
wherein, the first set is {8}, the second set is {1, 2, 4}, the value of the QCL parameter indicated by the first indication information is 8, and the value of the QCL parameter indicated by the second indication information is 4.

9. The method of claim 8, wherein, determining by the terminal the signal detection position within the second period based on the indication information and the first SSB candidate position comprises:
determining by the terminal a plurality of SSB candidate position sets based on the indication information, wherein each SSB candidate position set corresponds to a beam of the access network device, each SSB candidate position set comprises at least one SSB candidate position, and each beam is configured to send the SSB at an SSB candidate position in a respective SSB candidate position set; and
determining by the terminal all SSB candidate positions in the SSB candidate position set to which the first SSB candidate position belongs as signal detection positions within the second period.

10. The method of claim 9, wherein,
when the indication information is the first indication information, a modulo operation of an index of each SSB candidate position in the SSB candidate position set and the value of the QCL parameter indicated by the first indication information results in a same result.

11. The method of claim 9, wherein, when the indication information is the second indication information, a modulo operation of an index of each SSB candidate position in the SSB candidate position set and the value of the QCL parameter indicated by the second indication information results in a same result.

12. The method of claim 8, further comprising:

sequentially detecting by the terminal the SSB at each of determined SSB candidate positions;

determining a physical downlink control channel (PDCCH) associated with remaining minimum system information (RMSI) based on the SSB candidate position where the SSB is detected in response to the terminal detecting the SSB at any of the determined SSB candidate positions; and acquiring by the terminal the RMSI based on the PDCCH.

13. The method of claim 12, wherein, the RMSI comprises a number of SSBs sent by the access network device within one SSB period.

14. An apparatus for transmitting information, comprising:

a processor; and a memory configured to store instructions executable by the processor;

wherein, the processor is configured to execute a method for transmitting information, comprising:

receiving a synchronization signal block (SSB) sent by an access network device within a first period, wherein, the SSB carries indication information configured to indicate a quasi co-located (QCL) parameter;

acquiring the indication information from the SSB, wherein the indication information is configured to instruct a terminal to determine an SSB candidate position corresponding to a beam to be tracked based on the indication information in the SSB; and determining a signal detection position within a second period based on the indication information and a first SSB candidate position, wherein, the second period is a next period of the first period, and the first SSB candidate position is an SSB candidate position where the SSB is received within the first period;

wherein, the indication information is first indication information or second indication information, the first indication information is generated by the access network device in response to a value of the QCL parameter used by the access network device belonging to a first set, and the second indication information is generated by the access network device in response to the value of the QCL parameter used by the access network device belonging to a second set, and an intersection of the first set and the second set is empty;

wherein, the first set is {8}, the second set is {1, 2, 4}, the value of the QCL parameter indicated by the first indication information is 8, and the value of the QCL parameter indicated by the second indication information is 4.

* * * * *